(12) United States Patent
Bassey et al.

(10) Patent No.: US 8,396,739 B2
(45) Date of Patent: Mar. 12, 2013

(54) QUOTATION SYSTEM AND METHOD

(75) Inventors: Kenneth Q Bassey, Franklin, MI (US); Jasmin Cerkic, Chicago, IL (US)

(73) Assignee: Saphran Inc., Franklin, MI (US)

( * ) Notice: Subject to any disclaimer, the term of this patent is extended or adjusted under 35 U.S.C. 154(b) by 0 days.

(21) Appl. No.: 13/329,530

(22) Filed: Dec. 19, 2011

(65) Prior Publication Data

US 2012/0150575 A1 Jun. 14, 2012

Related U.S. Application Data

(63) Continuation of application No. 12/367,491, filed on Feb. 6, 2009, now Pat. No. 8,082,185, which is a continuation of application No. 10/483,480, filed as application No. PCT/US02/22249 on Jul. 12, 2002, now Pat. No. 7,720,716.

(60) Provisional application No. 60/305,279, filed on Jul. 12, 2001.

(51) Int. Cl.
*G06Q 10/00* (2012.01)

(52) U.S. Cl. .............. 705/7.35; 705/7.11; 705/7.29; 705/26.1; 705/26.4; 705/400

(58) Field of Classification Search ........ 705/26.1–27.2, 705/7.11, 7.29, 7.35, 400
See application file for complete search history.

(56) References Cited

U.S. PATENT DOCUMENTS

| | | | |
|---|---|---|---|
| 4,992,940 A | 2/1991 | Dworkin | |
| 5,008,853 A | 4/1991 | Bly et al. | |
| 5,249,120 A | 9/1993 | Foley | |
| 5,717,924 A | 2/1998 | Kawai | |
| 5,842,178 A | 11/1998 | Giovannoli | |
| 5,970,476 A | 10/1999 | Fahey | |
| 6,023,683 A | 2/2000 | Johnson et al. | |
| 6,115,690 A | 9/2000 | Wong | |
| 6,212,549 B1 | 4/2001 | Page et al. | |
| 6,370,562 B2 | 4/2002 | Page et al. | |
| 6,684,189 B1 * | 1/2004 | Ryan et al. ............ | 705/4 |
| 2001/0032154 A1 | 10/2001 | Schummer | |
| 2005/0198042 A1 | 9/2005 | Davis | |
| 2005/0283410 A1 | 12/2005 | Gosko | |
| 2008/0126265 A1 | 5/2008 | Livesay et al. | |

FOREIGN PATENT DOCUMENTS

| | | |
|---|---|---|
| JP | 07093414 | 4/1995 |
| JP | 2001175727 | 6/2001 |

OTHER PUBLICATIONS

Causeway Technologies Announces Launch of Overture, An Exciting New Era for Estimators. PR Newswire (New York) Mar. 5, 2001: 1. Retrieved via ProQuest on Dec. 3, 2012.*

Internet Capital Group Acquires Stake in Emptoris, Inc., Business Editors, Business Wire, New York: Apr. 27, 2000. p. 1.

PCT Search Report for PCT Application No. PCT/US2002/022249, May 23, 2003, 1 page.

* cited by examiner

*Primary Examiner* — Michael Misiaszek
(74) *Attorney, Agent, or Firm* — Maine Cernota & Rardin

(57) ABSTRACT

A quotation system and method are provided (see FIG. 1). A relational database (10) allows various departments (14, 16, 18, 20) to prepare a quotation. The relational database centralizes data to increase efficiency, and the data may be modified as needed, for particular quotation solutions.

12 Claims, 4 Drawing Sheets

QUOTATION SYSTEM AND METHOD

RELATED APPLICATIONS

This application is a continuation of U.S. application Ser. No. 12/367,491, filed on Feb. 6, 2009, which is a continuation of U.S. application Ser. No. 10/483,490, filed on Jul. 14, 2004 (issued U.S. Pat. No. 7,720,716, issue date May 18, 2010), which is a U.S. national phase 371 filing of PCT application PCT/US2002/022249 filed on Jul. 12, 2002, which claims the benefit of U.S. Provisional Application No. 60/305,279, filed Jul. 12, 2001. Each of these applications is herein incorporated by reference in its entirety for all purposes.

FIELD OF THE INVENTION

The present invention relates to a quotation system and method.

BACKGROUND OF THE INVENTION

The existing process for preparing a quotation, more specifically, a quotation for a custom-made product, is oftentimes cumbersome and inefficient for a number of reasons. For example, automotive suppliers mass produce products that are uniquely designed to customer specifications for assembly into vehicles. The automotive supplier uses a list of manufacturing processes and/or assembly components that are purchased from sub-suppliers. An automotive supplier is typically given about ten days to respond to a customer request for quotation. Within this ten-day or other reasonably short period of time, a rigorous business process takes place whereby people from multiple departments must contribute information and expertise to assess the design, manufacturing process, capacity, cost, investment, price, strategy, and logistics. Then, the supplier must submit its quotation in a format specified by the customer.

Due to the short period of time allowed by the customer for the supplier to prepare the quotation, the supplier typically faces difficult challenges when developing the quotation. For example, the supplier is faced with applying enormous overhead to process a request for quotation through its system and deliver a quotation to the customer within the short period of time. For example, the supplier may sometimes skip some approval steps or make assumptions to ensure timely submission of the quotation. This may result in inaccuracies and have undesirable results, particularly in markets with thin margins. For example, the supplier may be forced to deliver a late quotation due to the time constraints imposed by the customer. These are just a few examples of the difficulties faced by a supplier when preparing a quotation. Other obstacles faced by the supplier include the fact that sometimes geography and international borders separate contributors and approvers, making it difficult to manage and oversee the entire quotation process.

One technique for preparing quotations that is used today is a spreadsheet-based quotation technique. That is, various departments make calculations using spreadsheets and pass these spreadsheets along to each other using, for example, electronic mail. This results in data being separated from its origin, being difficult to track, and being nearly inaccessible for a subsequent analysis. As such, spreadsheet passing techniques used today, although sometimes successful, do have their shortcomings. Although the example given above relates specifically to automotive suppliers, this is only exemplary, and other industries may face similar problems in preparing quotations.

In addition, some attempts have been made to develop quotation software. Typically, existing quotation software involves substantial hard-coding and lacks the flexibility that is often needed to prepare customized quotations, such as, for example, in the automotive industry. Many times, a supplier will have their own particular way of performing cost calculations, and does not want to be restricted to the hard-coded techniques in the quotation software. Because existing quotation software lacks the desirable flexibility, many suppliers have stayed away from these existing software solutions. As a result, suppliers continue to use spreadsheet passing techniques which, as described above, also have shortcomings. Examples of quotation systems and methods are shown in U.S. Pat. Nos. 6,115,690; 5,970,476; 5,842,178; 5,717,924; 5,249,120; 5,008,853; 4,992,940; 6,212,549; and 6,370,562.

For the foregoing reasons, there is a need for a quotation system and method that overcomes the shortcomings of existing quotation preparation techniques.

SUMMARY OF THE INVENTION

It is, therefore, an object of the present invention to provide an improved quotation system and method that utilizes a relational database to centrally manage data accessed by multiple departments during the preparation of a quotation for a customer.

In carrying out the above object, a quotation system and method are provided. The system includes a relational database having a number of relations to relate, for example, manufacturing processes, cost parameters, calculations, and work flows so that various departments may prepare a quotation with improved accuracy, reduced overhead expenses, and faster delivery.

In one example, a sales department, design engineering department, process engineering department, and purchasing department all have access to the relational database to facilitate preparation of a quotation. The relational database provides centralized data that overcomes limitations associated with spreadsheet passing and related methods. In addition, the relational database provides flexibility in that relational database data may be modified or added to change the way calculations are performed. The ability to modify the data in the relational database overcomes limitations associated with hard-coded quotation software solutions. As such, systems and methods of the present invention allow a supplier, with various departments, to efficiently prepare a quotation. In addition, systems and methods of the present invention allow modification of the data so that the relational database may be adapted to the needs of different suppliers.

The above object and other objects, features, and advantages of the present invention are readily apparent from the following detailed description of the preferred embodiment when taken in connection with the accompanying drawings.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
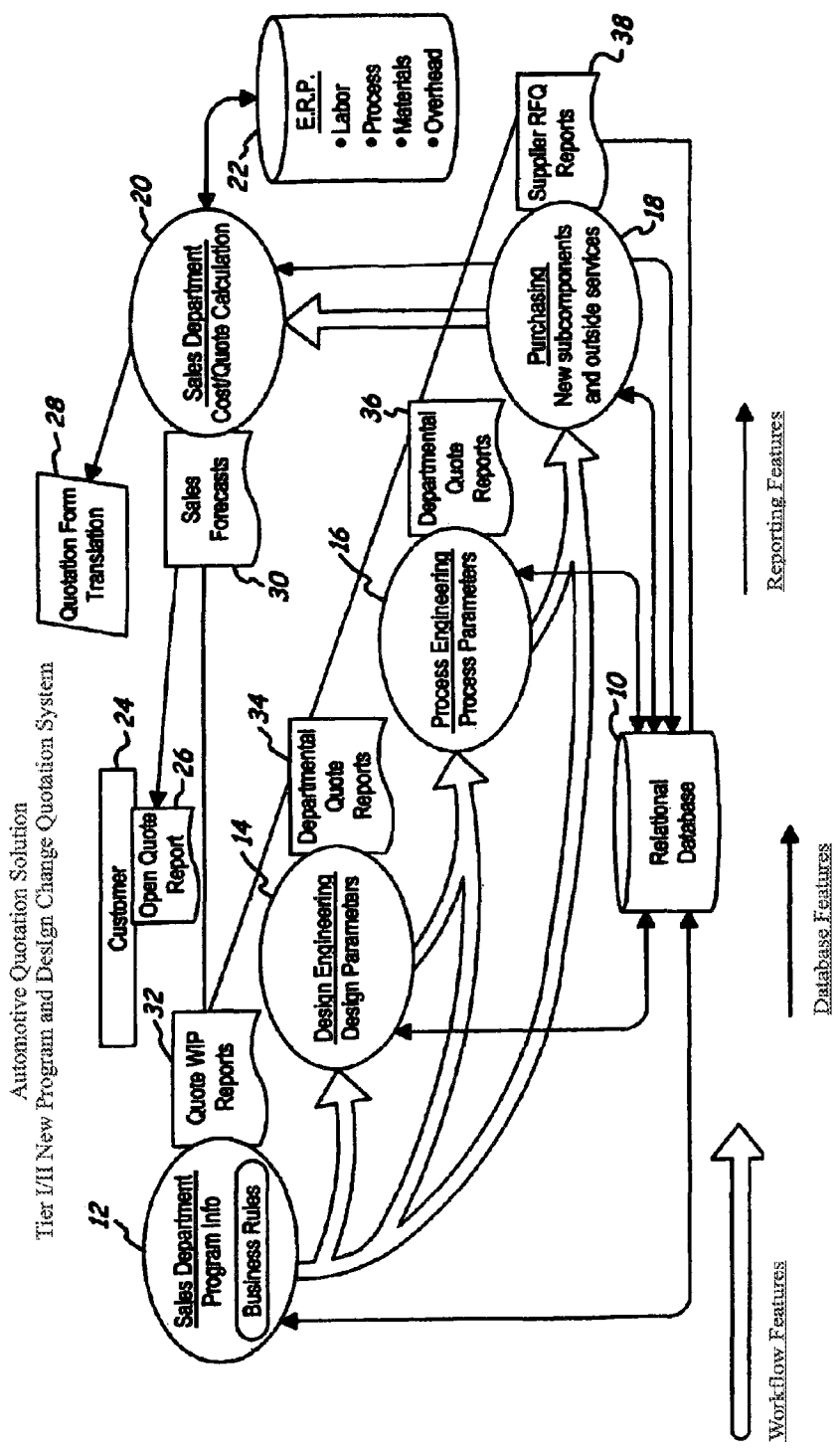
FIG. 1 is a work flow diagram illustrating work flow among a sales department, design engineering department, process engineering department, and purchasing department, as well as the relational database.

In FIG. 1, a relational database is indicated at 10. The relational database is recorded on a computer-readable medium and may be implemented in a variety of ways as appreciated by one of ordinary skill in the art. Preferably, the relational database is implemented using a database management system (DBMS), such as SQL SERVER available from Microsoft. Sales department 12, design engineering department 14, process engineering department 16, and purchasing department 18 may all interact with database 10. The sales department is also indicated at 20, receiving the quotation in a final stage. Sales department 20 has access to additional information in database 22 so that sales department 20 may work with the cost structure provided by the other departments to develop a quote structure for the quotation being given to customer 24 as report 26. The present invention also contemplates quotation form translation 28 for providing other language quotations. As shown, quote reports are present at each department (32, 34, 36, 38). Sales department 20 also may create sales forecasts 30 as further described below.

The Embodiment of FIG. 1 includes the following features:

Overall Features:
  Improve Quotation Accuracy
  Reduce Overhead Expense
  Accelerate Quotation delivery to your customers
Workflow Features:
  Web-based access from anywhere!
  Automatic Notification /Renotification
  Instant work reallocation in a department
  Business rules assign work by contributors and approvers
  Input screens eliminate format concerns
  Multi-lingual input screens (enable international design/collaboration)
Database Features
  Old design level costs/quotes are prompted, eliminating re-entry
  Material & component parts are costs are prompted for easy/immediate access
  Manufacturing processes and costs are prompted for easy/immediate access
Reporting Features
  Flexible
  Work-in-process by person/department
  Long term sales forecasts by customer/product/plant/etc.
  Outstanding quotations by customer/for customers
    Analytic reports improve strategic success of quotations.

Although the preferred implementation illustrated in the drawings relates to an automotive quotation solution, embodiments of the present invention may be useful for other applications where customized quotations and/or customized products are desired. The relational database 10 allows departments to collaborate only when necessary resulting in improved quotation accuracy, reduced overhead expense, and accelerated quotation delivery to customer 24. In addition, FIG. 1 depicts preferred work flow, database, and reporting features. Preferred embodiments of the present invention, in addition to utilizing relational database 10 to prepare quotations, facilitate long-term forecasting. In a preferred implementation, for example, in an automotive quotation solution, vehicle set and vehicle volume information are provided to sales department 20 via database 10 to allow comprehensive sales and margin reporting. In a traditional approach, vehicle sets and vehicle volumes are gathered with a tedious process requiring months of work and analysis to provide sales and margin reporting. In accordance with the present invention, by providing this or other suitable information to relational database 10, the efficiencies of the quotation system and method of the present invention may be applied to long-term forecasting applications, as well as quotation preparation applications.

As FIG. 1 illustrates the relational database and associated work flows, it is understood that a suitable interface is provided so that the various departments may interface with relational database 10. For example, a web-based interface is preferred to allow access to relational database 10 from anywhere. Interfaces may be customized for individual departments and further customized for contributors and approvers. For example, sales department 12 may access relational database 10 via a new quote request screen that allows sales department 12 to enter the description and specification into relational database 10. Thereafter, the various other departments use appropriate interface screens to select, modify, and add parameters as necessary to develop the quotation. The interfaces for each department may be designed specifically for that department such that only needed information is available. For example, design engineering department 14 is given an interface that illustrates only information needed by design engineering department 14 and similarly for other departments. And as mentioned above, interface screens may be further customized within a department, for example, contributors and approvers may have slightly different interfaces or permissions to modify values within relational database 10.

Figure 2:
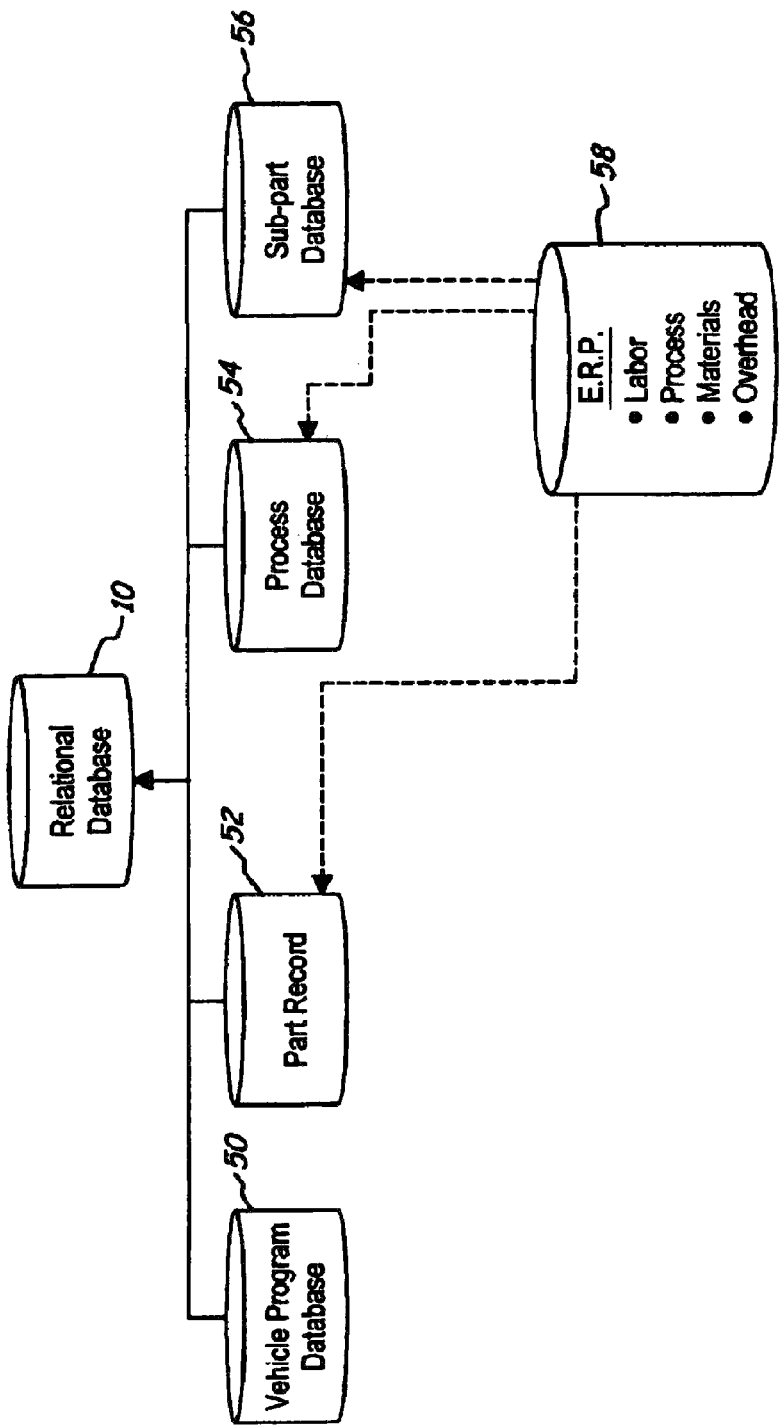
FIG. 2 is a block diagram illustrating a preferred embodiment wherein a single relational database includes portions representing vehicle program information, part record information, process information, and sub-part information.
Figure 3:
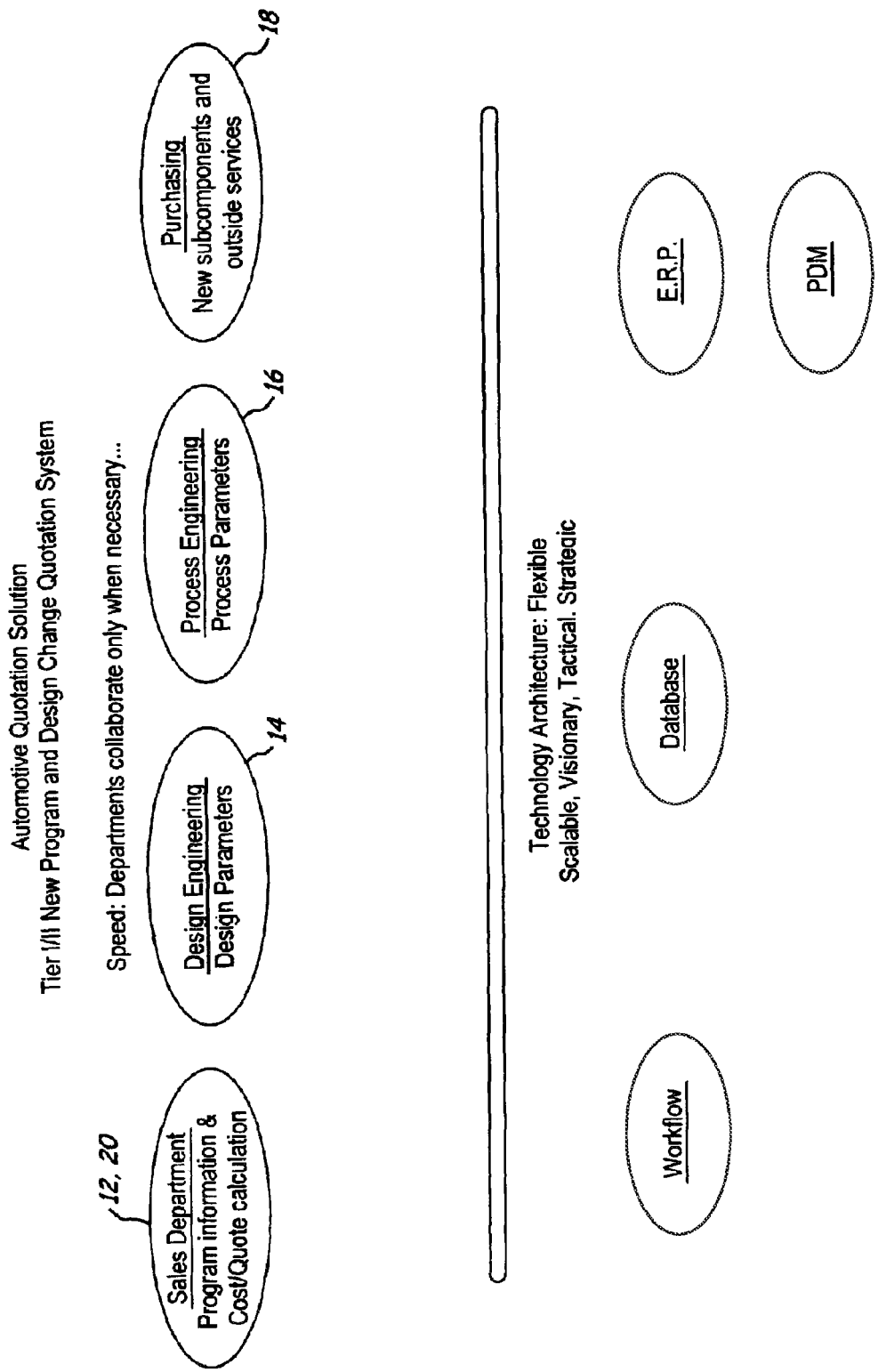
FIG. 3 illustrates the cooperation of various departments in a preferred embodiment.

In addition to the interface screens that correspond to the work flows, additional interface screens may be provided for users outside of the work flow. For example, a plant controller may use an administrative screen to control certain parameters that apply to many or all parts (for example, labor rates). It is appreciated that in accordance with the present invention, relational database 10 centralizes data associated with the quotation and overcomes shortcomings associated with spreadsheet passing and other previously known techniques for generating quotations. In addition, relational database data may be modified or added to change the way calculations are performed to meet the needs of a particular supplier or quotation preparer. If desired, the relations may be modified to integrate with legacy systems at a supplier. And, as such, the ability to customize the relations provides added flexibility that overcomes shortcomings associated with hard-coded quotation software used in the past. Although some examples were given above for specific interface techniques to interface the departments to relational database 10, it is appreciated that those skilled in the art of relational databases and database management systems understand that a wide variety of interfaces may be used to achieve embodiments of the present invention, and the present invention is not limited to any particular form of database interface. Further, although a preferred implementation of the present invention has been described with reference to materials, components, processes, and other elements applicable to automotive quotation solutions, it is appreciated that the specific details and attributes of relational database 10 may vary widely as understood by one of ordinary skill in the art of relational databases. FIG. 2 illustrates that the relational database preferably includes other information (in an automotive supplier application), such as vehicle program information 50, part record information 52, process information 54, and sub-part information 56, as well as information 58. FIG. 2 also illustrates an example of specific information for database 10 underneath each sub-database. FIG. 3 further illustrates departments 12, 14, 16, 18, 20 and illustrates other features and advantages of the present invention.

The embodiment of FIG. 2 includes the following features:
General Features:
    Accuracy: A single source for costs—the best source for costs—eliminates data reentry . . .
    Accuracy: Having the right information at your fingertips eliminates faulty assumptions . . .
Vehicle Program Database (element 50)
    Customer
    Program Name
    Volume
    Location
    Program Dates
Part Record (element 52)
    A part record includes:
    Program Assignment
    Part name, no., design level
    Usage ratio per vehicle .
    Customer Approval Status
    Worlkflow and approval status
    All Cost elements
        Materials
        Labor
        Process
        Aux Process
        Subcomponents
        Overhead
    All Price elements
        Same as cost elements
        SGA and
        PROFIT
Process Database (element 54)
    Manufacturing Process Unit
    Machine description
    Operating parameters
Sub-Part Database (element 56)
    Purchased sub components
    In-house sub-components
ERP (element 58)
    Labor
    Process
    Materials
    Overhead The Embodiment of FIG. 3 includes the following features:
Sales Department (elements 12 and 20):
    Sales sets business rules for workflow so other departments are only involved where necessary
Design Engineering (element 14):
    Design input screen is multi-lingual for contributional collaboration from overseas R&D centers
Process Engineering (element 16):
    Process Engineers manage the process database for easy access by other departments; less time waste
Purchasing (element 18):
    Purchasing manages sub-part database for easy access by other departments; less time waste Workflow:
    Written in ASP or Java to fit your technology architecture
    Workflow can be designed with less or more input screens to fit your business model and achieve best business practice
Database:
    logical database tables can be stored in any system to fit your technology architecture
E.R.P.:
    Data can be retrieved from any E.R.P. system to fit your technology architecture
PDM:
    Supplement your Engineering-centric systems with a Customer-centric Quotation Solution.

Figure 4:
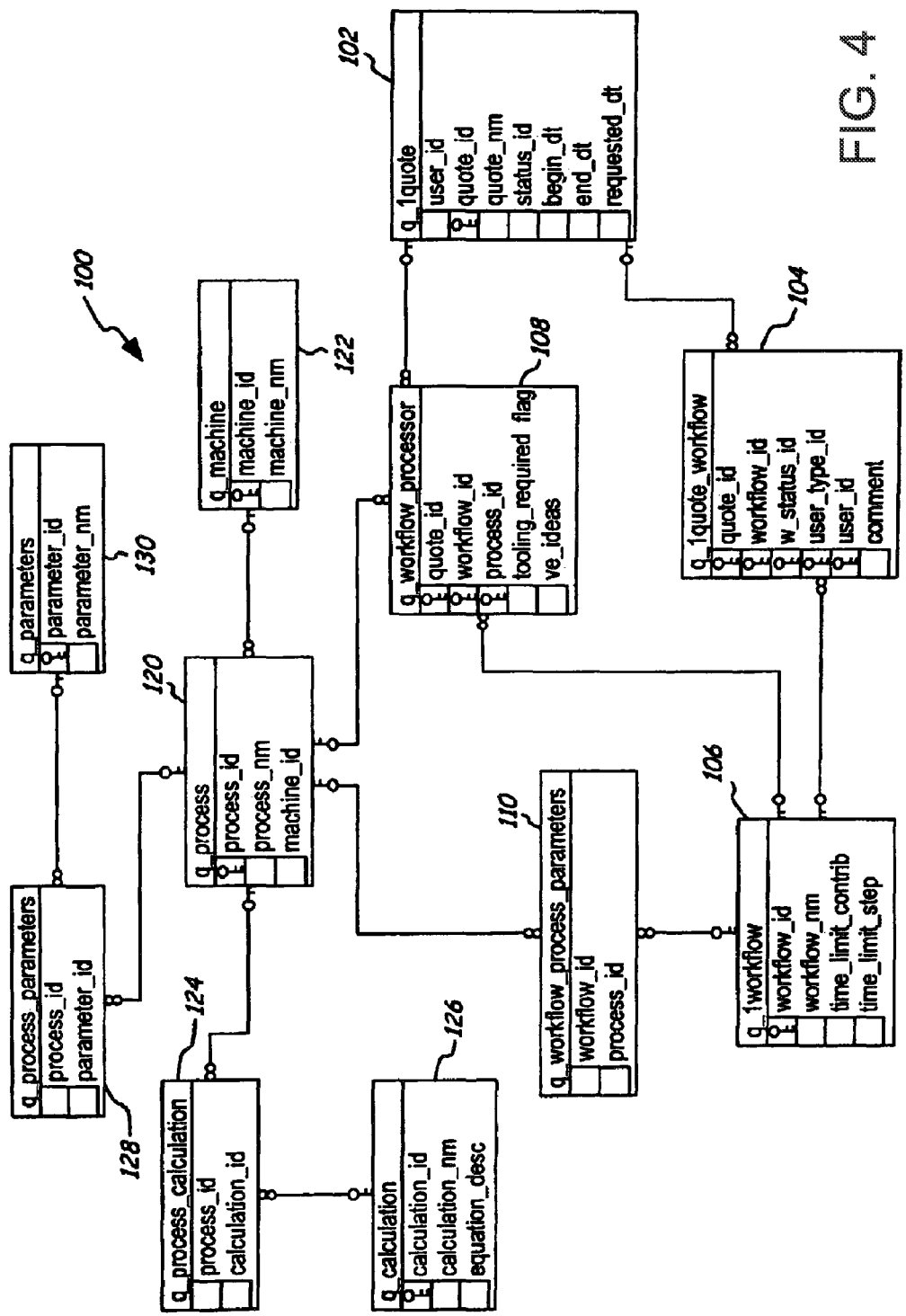
FIG. 4 illustrates an example of the flexibility of the relational database, illustrating a number of relations including processes, process parameters, and calculations with data that may be customized to suit the needs of particular suppliers.

FIG. 4 illustrates an exemplary portion of a set of relations used in an exemplary embodiment of the present invention. That is, data in relational database 10 may be modified for a particular application, as needed, overcoming problems associated with hard-coded software packages used in the past. As shown in FIG. 4, a set of relations is generally indicated at 100. Each relation includes a number of attributes, and indicates, where appropriate, keys. Relations 102, 104, 106, 108, and 110 illustrate attributes relating to quotation identification and work flow. In accordance with a preferred embodiment of the present invention, relation 120 includes attributes related to process. As shown, relation 120 includes process identification, process name, and machine identification. Relation 122 includes machine identification and machine name. Relation 124 includes process identification and calculation identification. Relation 126 includes calculation identification, calculation name, and equation description. In accordance with the present invention, data corresponding to equation description of relation 126 may be modified, as needed, to suit the needs of a particular quotation preparer to allow customization of the internal calculations of relational database 10. Further, relation 128 includes attributes for process identification and parameter identification, and relation 130 includes attributes for parameter identification, and parameter name. That is, the calculation is a function of parameters for a particular process to determine the cost of the process. In accordance with the present invention, the technique utilized to perform the calculation may be modified, as needed, for a particular application. As such, data in relational database 10 can be customized, as needed, for particular applications, without the extreme expense associated with re-developing a hard-coded application from the start.

In a preferred implementation of the relational database, the ability to modify and add data includes the ability to add new processes. The ability to add new processes may be made available to the supplier. In addition, new parameters and new calculations may be associated with the new process. Similarly, embodiments of the present invention contemplate the ability to add new materials, new components, and other new information to relational database 10 without disturbing the overall organization of the data.

Further, in a preferred embodiment, various parameters may be assigned to different user types. For example, a certain group of parameters may be modifiable only by design engineers' another group of parameters may be modifiable only by process engineers, and so on.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for estimating a cost relevant to producing a custom product by efficiently soliciting input from a plurality of various departments, the system comprising:
   non-transient computer readable media containing software that is able to direct the actions of a computer so as to carry out the steps of:
   accepting collaboration data from a user of the system;
   storing the collaboration data in a relational database;
   interpreting the collaboration data so as to assign input of each of a plurality of required items of estimation data to one of the plurality of departments;
   for each of the departments, creating a customized data input interface that solicits only the required items of estimation data assigned to the department for input, creating the customized data input interfaces not requiring alteration of previously entered software code and not requiring selection of a previously created data input interface;
   presenting to each of the departments the data input interface that solicits the items of estimation data assigned to the department for input;
   upon input of all required estimation data by the departments, estimating the cost relevant to producing the custom product; and
   providing the estimated cost to a user of the system.

2. The system of claim 1, wherein the cost relates to at least one of:
   a manufacturing process;
   a raw material;
   a purchased part;
   a product set; and
   a product volume.

3. The system of claim 1, wherein the various departments include at least one of:
   a sales department;
   a design engineering department;
   a process engineering department; and
   a purchasing department.

4. The system of claim 1, wherein each of the customized data input interfaces is configured to allow limited access to the relational database based on the corresponding department and further based on a user status from a group including contributors and approvers.

5. The system of claim 1, wherein data entered into the relational database is stored for use in prompting future input of data from a user of the system.

6. The system of claim 1, wherein data is accepted from a user of the system who is in communication with the relational database using a web-based interface.

7. A method for estimating a cost relevant to producing a custom product by efficiently soliciting input from a plurality of various departments, the method comprising:
   accepting collaboration data from a user;
   storing the collaboration data in a relational database on non-transient computer-readable media;
   interpreting the collaboration data so as to assign input of each of a plurality of required items of estimation data to one of the plurality of departments;
   for each of the departments, creating a customized data input interface that solicits only the required items of estimation data assigned to the department for input, creating the customized data input interfaces not requiring alteration of previously entered software code and not requiring selection of a previously created data input interface;
   presenting to each of the departments the data input interface that solicits the items of estimation data assigned to the department for input;
   upon input of all required estimation data by the departments, estimating the cost relevant to producing the custom product; and providing the estimated cost to a user.

8. The method of claim 7, wherein the cost relates to at least one of:
   a manufacturing process;
   a raw material;
   a purchased part;
   a product set; and
   a product volume.

9. The method of claim 7, wherein the various departments include at least one of:
   a sales department;
   a design engineering department;
   a process engineering department; and
   a purchasing department.

10. The method of claim 7, wherein each of the customized data input interfaces is configured to allow limited access to the relational database based on the corresponding department and further based on a user status from a group including contributors and approvers.

11. The method of claim 7, wherein data entered into the relational database is stored for use in prompting future input of data from a user.

12. The method of claim 7, wherein data is accepted from a user who is in communication with the relational database using a web-based interface.

* * * * *